United States Patent [19]

Hayata et al.

[11] Patent Number: 5,115,643
[45] Date of Patent: May 26, 1992

[54] METHOD FOR OPERATING AIR CONDITIONER

[75] Inventors: Yoshiki Hayata; Masashi Watanabe; Kisuke Tashiro, all of Shimizu, Japan

[73] Assignee: Hitachi, Ltd., Tokyo, Japan

[21] Appl. No.: 620,056

[22] Filed: Nov. 30, 1990

[30] Foreign Application Priority Data

Dec. 1, 1989 [JP] Japan .................................. 1-312999

[51] Int. Cl.⁵ .............................................. F25B 1/00
[52] U.S. Cl. ........................................ 62/115; 62/126; 236/94
[58] Field of Search .................. 62/129, 127, 126, 125, 62/115; 236/94; 165/11.1

[56] References Cited

U.S. PATENT DOCUMENTS

| | | | |
|---|---|---|---|
| 4,381,549 | 4/1983 | Stamp, Jr. et al. | 165/11.1 X |
| 4,432,210 | 2/1984 | Saito | 62/126 |
| 4,821,528 | 4/1989 | Tershak | 62/127 X |
| 4,841,735 | 6/1989 | Oike | 62/127 X |

FOREIGN PATENT DOCUMENTS 0069444 4/1985 Japan .

OTHER PUBLICATIONS

Hitachi, Service Manual No. PAH-8802, Aug. 1988.

Primary Examiner—Albert J. Makay
Assistant Examiner—John Sollecito
Attorney, Agent, or Firm—Antonelli, Terry, Stout & Kraus

[57] ABSTRACT

Disclosed is a method for operating an air conditioner which is basically composed of an outdoor unit and an indoor unit and whose operation is controlled on the basis of values measured by a plurality of temperature sensors. When any one of the plural sensors is disabled due to wire disconnection, short-circuit or like trouble, and when a specific sensor which has a complementary relation with the disabled sensor with respect to the heat cycle or which has an object of measurement substantially the same as that of the disabled sensor is normally functioning without any wire disconnection, short-circuit or like trouble, the value measured by the specific sensor is based to presume the value that will be measured by the disabled sensor if the disabled sensor functions normally, and the operation of the air conditioner is continued on the basis of the presumed value.

5 Claims, 5 Drawing Sheets

METHOD FOR OPERATING AIR CONDITIONER

BACKGROUND OF THE INVENTION

This invention relates to a method for operating an air conditioner, and, more particularly, to a method of operation wherein, even upon a trouble wire disconnection of short-circuit may in any of the sensors detecting various operation control parameters required for the operation of the air conditioner, another normal sensor which has a complementary relation with the disabled sensor with respect to the heat cycle or which has an object of measurement substantially the same as that of the disabled sensor is substituted for the purpose of measurement, so that the air conditioner can continuously be operated without stopping.

As is well known, an air conditioner is basically composed of an outdoor unit and an indoor unit, and a plurality of sensors are respectively provided for the outdoor and indoor units. The operation of the air conditioner is controlled on the basis of values measured by these sensors.

In a modern air conditioner, a variety of functions are required together with an improvement in the amenity of air conditioning, and, to meet this requirement, the number of the sensors is being increased. This means that the probability of occurrence of wire disconnection, short-circuit or similar problem in the sensors increases, and measures for dealing with such sensor problems are now demanded. There are various prior art publications concerning such countermeasures. According to "Free Service Manual for Hitachi's Building Air Conditioner Himul Set, No. PAH-8802, pp. 3-37 to 3-44", the operation of an air conditioner is stopped in the event of occurrence of trouble in any one of sensors, the detail of the sensor trouble is coded and displayed. Also, according to JP-A-60-69444, when a control part in an indoor unit of an air conditioner is disabled, a signal for forcibly operating a compressor in an outdoor unit is applied from the indoor unit so as to forcibly operate the compressor in the outdoor unit.

Thus, the prior art practices are merely such that, when a sensor is disabled, the sensor trouble is displayed, and the operation of the air conditioner is stopped, or, when the indoor control part is disabled, the compressor in the outdoor unit is forcibly operated. Therefore, in prior art, the normal operation control of the air conditioner cannot be continued when any one of the sensors is disabled.

SUMMARY OF THE INVENTION

It is an object of the present invention to provide a method for operating an air conditioner in which, even when any one of a plurality of sensors may be disabled due to wire disconnection, short-circuit or the like another normal sensor which has a complementary relation with the disabled sensor with respect to the heat cycle or which has an object of measurement substantially the same as that of the disabled sensor is substituted, so that the normal operation control of the air conditioner can be continued on the basis of the value measured by the normally functioning sensor.

The present invention provides a method for operating an air conditioner which is basically composed of an outdoor unit and an indoor unit and whose operation is controlled on the basis of values measured by a plurality of temperature sensors, wherein, when any one of the plural sensors is disabled due to wire disconnection, short-circuit or the like, and when a specific sensor which has a complementary relation with the disabled sensor with respect to the heat cycle or which has an object of measurement substantially the same as that of the disabled sensor is normally functioning without any wire disconnection, short-circuit or like trouble, the value measured by the specific sensor is based to presume the value that will be measured by the disabled sensor if the disabled sensor functions normally, and the operation of the air conditioner is continued on the basis of the presumed value.

DESCRIPTION OF THE PREFERRED EMBODIMENT

Figure 1:
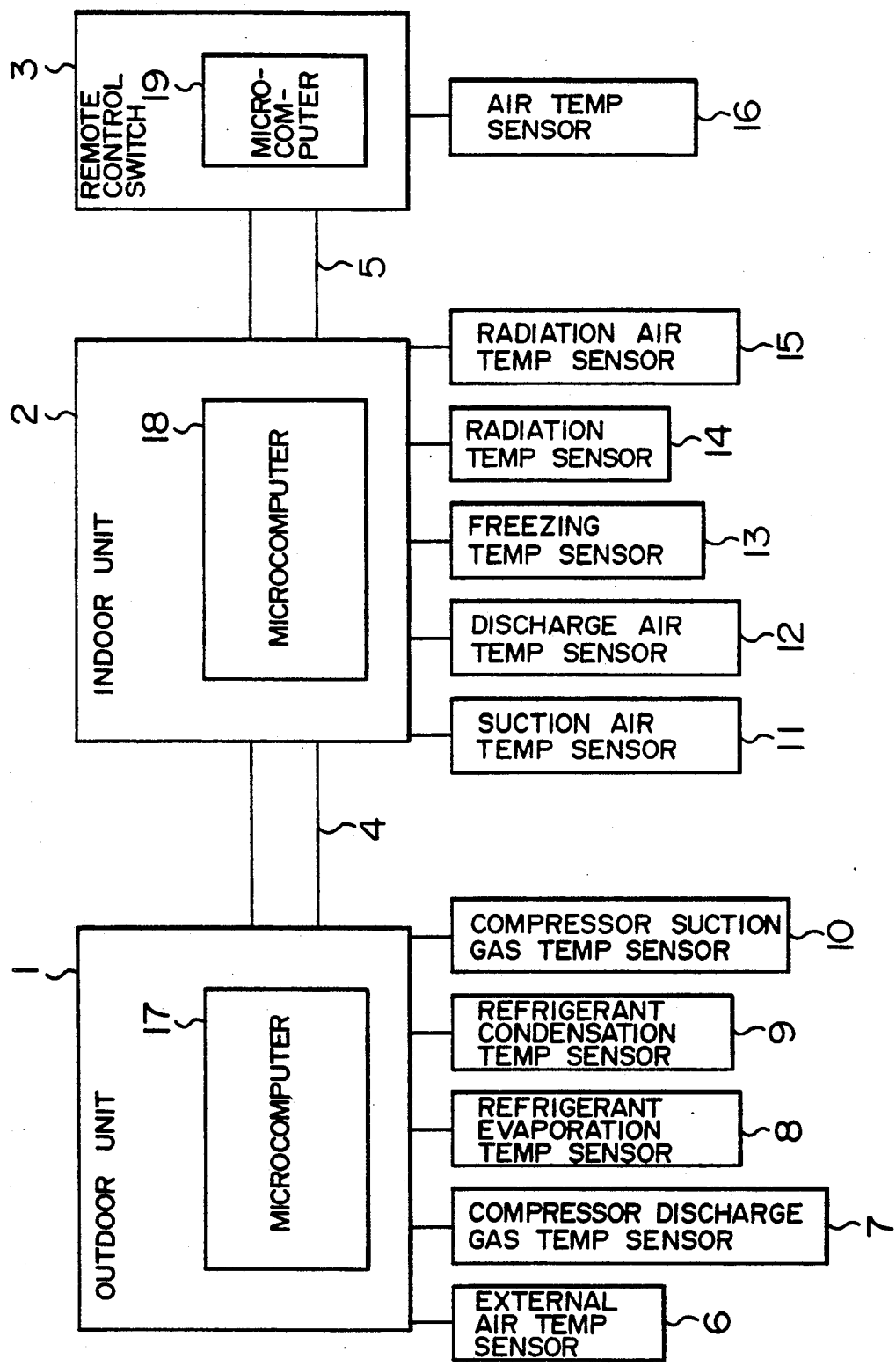
FIG. 1 is a block diagram of an air conditioner operated by an embodiment of the method of the present invention and shows also the arrangement of various sensors.

As shown in FIG. 1, an air conditioner is composed of an outdoor unit 1, an indoor unit 2 and a remote control switch 3 connected by wirings 4 and 5, and microcomputers 17, 18, 19 are incorporated in the outdoor unit 1, the indoor unit 2 and the remote control switch 3 respectively.

The outdoor unit 1 is provided with an external air temperature sensor 6, a compressor discharge gas temperature sensor 7, a refrigerant evaporation temperature sensor 8, a refrigerant condensation temperature sensor 9 and a compressor suction gas temperature sensor 10.

The indoor unit 2 is provided with a suction air temperature sensor 11, a discharge air temperature sensor 12, a freezing temperature sensor 13, a radiation temperature sensor 14 and a radiation air temperature sensor 15. The sum of the value of radiant heat from the walls, floor, etc. in the room and the value of the air temperature at the position of the radiation temperature sensor 14 is measured by the sensor 14, the radiation air temperature sensor 15 can detect the temperature of air at the position of the sensor 14. Therefore, when the output signals from the sensors 14 and 15 are combined, the value of the radiant heat from the walls, floor, etc. of the room can only be detected.

The remote control switch 3 is provided with an air temperature sensor 16 detecting the value of the temperature of air around the remote control switch 3.

Figure 2:
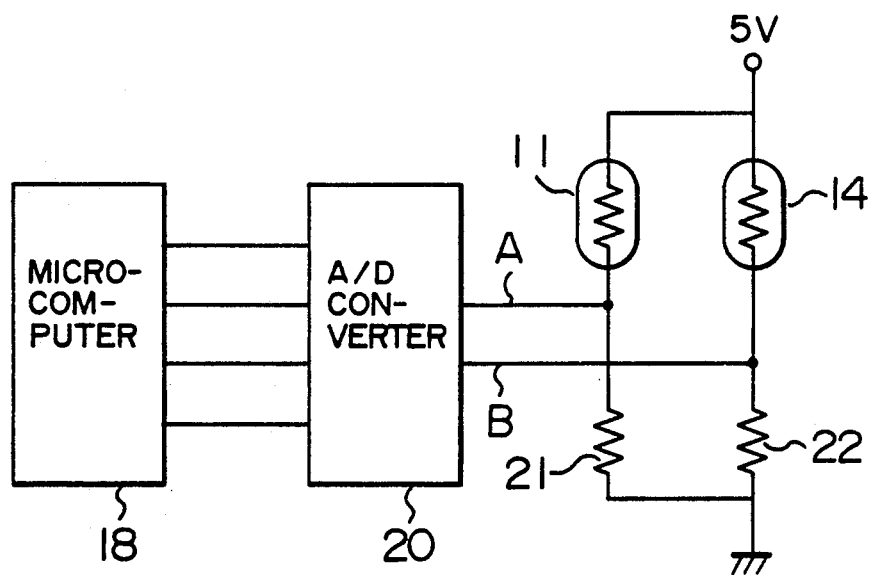
FIG. 2 is a schematic view of a connection diagram of sensors connected through an A/D converter to the microcomputer in the indoor unit shown in FIG. 1.

FIG. 2 shows, by way of example, one form of a temperature detection circuit including the temperature sensors 11 and 14. Each of the suction air temperature sensor 11 and the radiation temperature sensor 14 is in the form of a thermistor element having a resistance value which in response to a change in the air temperature. These sensors 11, 14 and dividing resistors 21, 22 are respectively connected in series to a voltage source of 5 V as shown in FIG. 2, and voltages at the connection points are measured so as to detect the temperature.

The voltage $V_A$ at a point A in FIG. 2 can be calculated according to the following equation:

$$V = 5 V \times \frac{R_{21}}{R_{21} + R_{11}}$$

where $R_{11}$ is the resistance value of the sensor 11, and $R_{21}$ is the resistance value of the dividing resistor 21.

The value of this voltage $V_A$ represents the temperature value measured by the sensor 11, and this analog voltage value is converted by an A/D converter 20 into a digital value which is supplied as an input to the microcomputer 18 to be utilized for the purpose of control. Similarly, the voltage $V_B$ at a point B represents the temperature value measured by the sensor 14, and an A/D converted value is also supplied as an input to the microcomputer 18.

When, for example, the suction air temperature sensor 11 is short-circuited, the value of the resistance value is $R_{11}=0$, and the value of the voltage $V_A$ is calculated as 5 V from the above equation. On the other hand, when the sensor 11 is subjected to wire disconnection, the value of is $R_{11}=\infty$, and the value of $V_A$ is 0 V (the earth potential). The microcomputer 18 utilizes the above fact to decide that the sensor 11 is disabled. The same applies also to the sensor 14.

The A/D converter 20 shown in FIG. 2 discriminates the level of the sensor output signal according to one of 250 levels. When the input signal from the sensor 11 or 14 is within the range of from the 5th to the 245th level, the A/D converter 20 decides that the sensor 11 or 14 is free from wire disconnection or short-circuit trouble. On the other hand, when the resistance value of the sensor becomes $R=\infty$ or $R=0$ due to wire disconnection or short-circuit trouble, the A/D converter 20 discriminates the range of from the 246th to the 250th level in the case of the wire disconnection trouble and the range of from the 0th to the 4th level in the case of the short-circuit trouble. Thus, the trouble can be discriminated.

The same applies also to the other temperature sensors.

Figure 3:
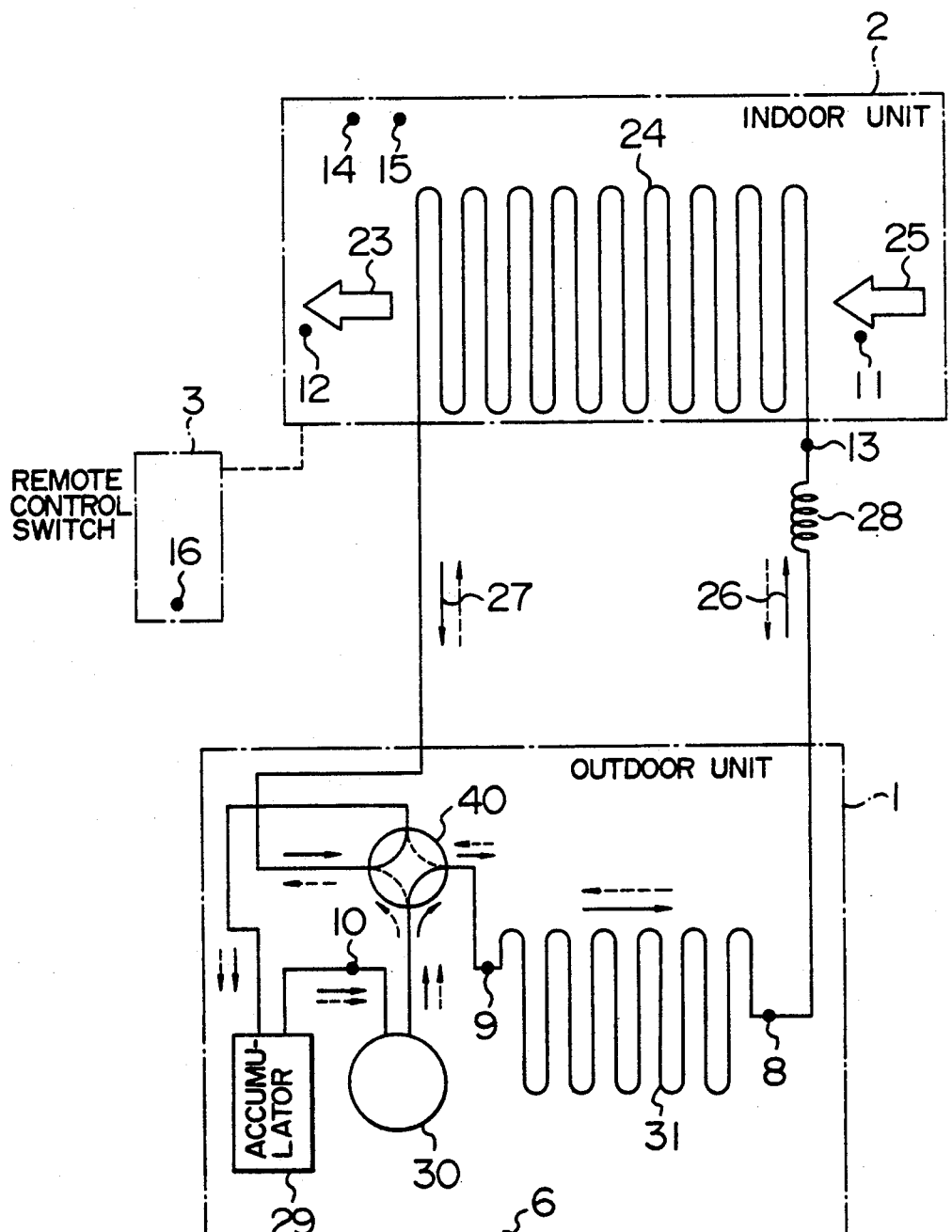
FIG. 3 is a schematic view of a refrigerant circulation cycle to which the present invention may be applied together with the positions of the sensors.

Referring to FIG. 3, a refrigerant in a heat exchanger 24 in the indoor unit 2 is fed into an accumulator 29 in the outdoor unit 1 and is then compressed by a compressor 30, and, after compression, the refrigerant is recirculated from a heat exchanger 31 into the heat exchanger 24 in the indoor unit 2 to complete the refrigeration cycle. A four-way valve 40 is disposed in the outdoor unit 1. When the air conditioner is placed in its air cooling mode, the four-way valve 40 is changed over to feed the refrigerant in a direction as shown by the solid lines 26 and 27, so that the refrigerant is condensed in the heat exchanger 31 in the outdoor unit 1 and then evaporated in the heat exchanger 24 in the indoor unit 2. On the other hand, when the air conditioner is placed in its air heating mode, the four-way valve 40 is changed over to feed the refrigerant in a direction as shown by the broken lines, so that the refrigerant is evaporated in the heat exchanger 31 in the outdoor unit 1 and then condensed in the heat exchanger 24 in the indoor unit 2.

Figure 4A:
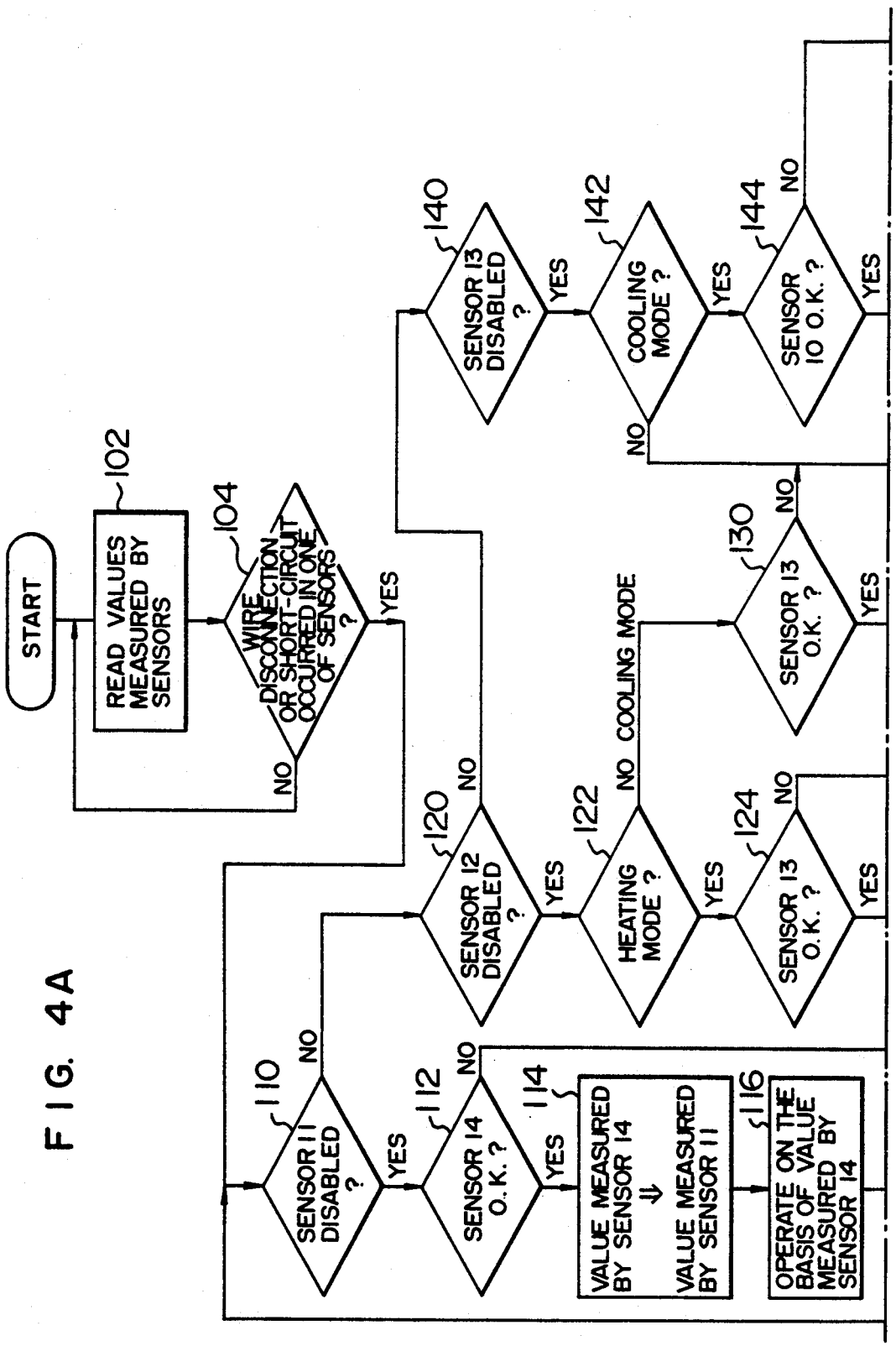
FIGS. 4A and 4B are flow charts showing the sequence of operation control according to the method of the present invention.
Figure 4B:
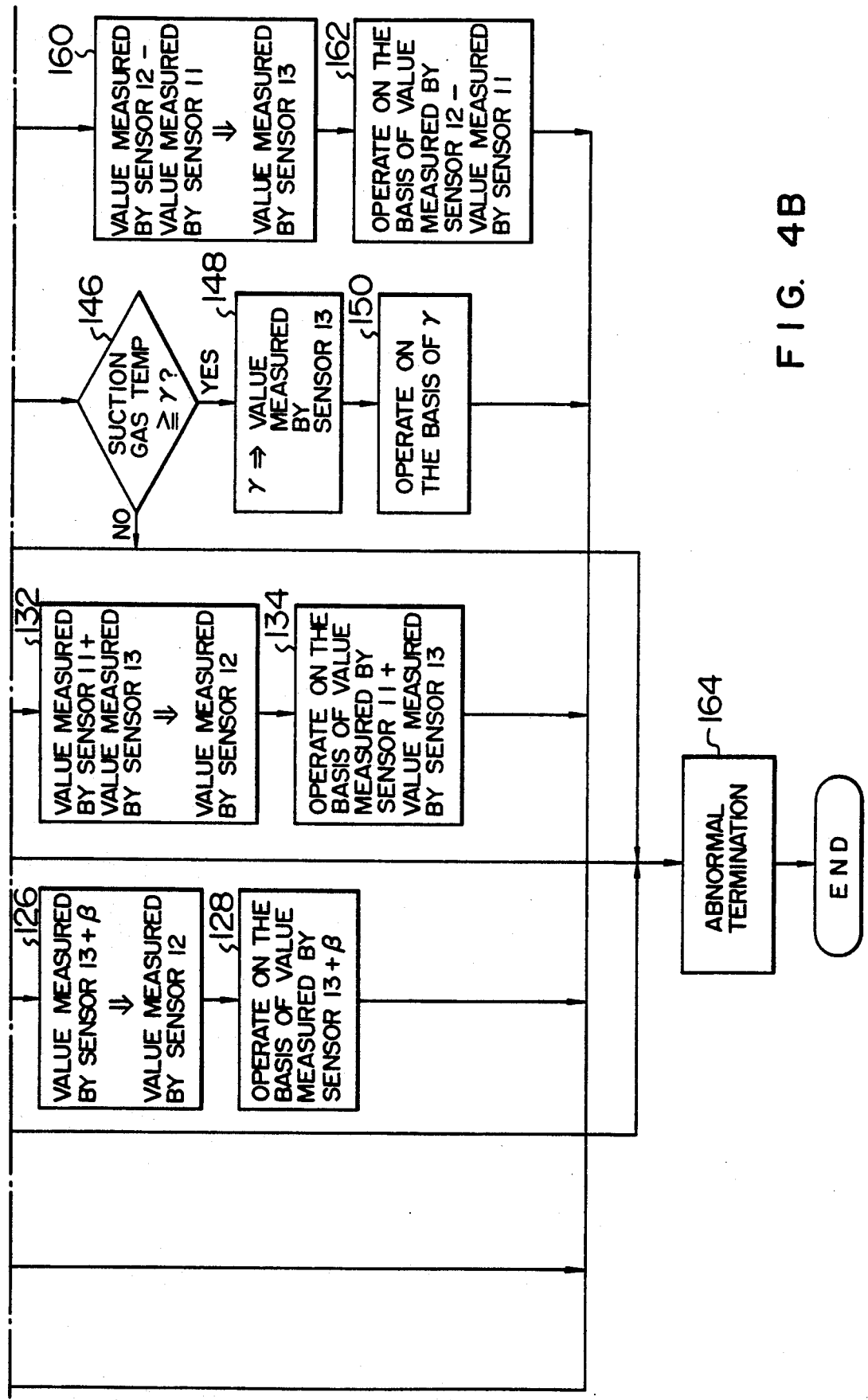

When the suction air temperature sensor 11 shown in FIGS. 1 and 3 is disabled, the value measured by the radiation temperature sensor 14 is substituted to be used for the control. The sequence of control in such a case is shown in FIGS. 4A and 4B. The reason why the value measured by the radiation temperature sensor 14 can be used in lieu of that measured by the suction air temperature sensor 11 will now be described. Both of these two sensors 11 and 14 measure the temperature of air on the suction side of the indoor unit 2 of the air conditioner, and the value measured by the radiation temperature sensor 14 includes the radiation temperature of a numerically very small value added to the suction air temperature. Therefore, the value measured by the radiation temperature sensor 14 can be substituted for the value measured by the suction air temperature sensor 11.

Processing to deal with the case where the suction air temperature sensor 11 is disabled due to wire disconnection or short-circuit trouble will now be described in steps 110 to 116 in a flow chart shown in FIGS. 4A and 4B.

In a step 102, the microcomputer 18 reads the values measured by the associated sensors 11 to 15, and, when wire disconnection or short-circuit of any one of these sensors is detected in a step 104, this step 104 is followed by step 110. When microcomputer 18 decides that the suction air temperature sensor 11 is disabled due to wire disconnection or short-circuit trouble in step 110, decision is made in the step 112 as to whether or not the radiation temperature sensor 14 is disabled due to wire disconnection or short-circuit trouble. When the radiation temperature sensor 14 is not disabled as a result of decision made in the step 112, step 112 is followed by step 114 in which the value measured by the radiation temperature sensor 14 is substituted for the value that will be measured by the suction air temperature sensor 11. Then, in step 116, the operation of the air conditioner is controlled on the basis of the value measured by the radiation temperature sensor 14. On the other hand, when the radiation temperature sensor 14 is determined as being disabled due to wire disconnection or short-circuit in the course of the above flow, there is no sensor which can be substituted, and step 112 is followed by an abnormal termination step 164.

On the other hand, when the discharge air temperature sensor 12 is disabled, the value which is the sum of the value measured by the freezing temperature sensor 13 and a fixed value $\beta$ is substituted, and the operation of the air conditioner is controlled on the basis of the above value. The sequence of control in such a case is shown in steps 120 to 128 in FIGS. 4A and 4B. First, the reason why the sum of the value measured by the freezing temperature sensor 13 and the fixed value $\beta$ can be used in lieu of the value measured by the discharge air temperature sensor 12 will be described with reference to FIG. 3.

As will be apparent from FIG. 3, a suction air flow 25 is turned into a discharge air flow 23 after heat exchange in the heat exchanger 24 in the indoor unit 2. That is, the sum of the temperature of the suction air flow 25 and the quantity of heat provided by the refrigerant in the heat exchanger 24 in the indoor unit 2 provides the temperature of the discharge air flow 23. Because the temperature of the refrigerant at the inlet of the heat exchanger 24 in the indoor unit 2 is measured by the freezing temperature sensor 13, the quantity of heat provided by the refrigerant can be computed, so that the temperature of the discharge air flow 23 can be presumed from the value measured by the freezing temperature sensor 13. In the illustrated embodiment, the discharge air temperature sensor 12 is used so that a cool air flow may not be discharged from the indoor unit 2 at the time of starting the heating operation.

Therefore, the operation of the air conditioner can be controlled even when the sum of the value measured by the freezing temperature sensor 13 and the fixed value β is used to substitute the value measured by the discharge air temperature sensor 12.

The processing sequence to deal with the case where the discharge air temperature sensor 12 is disabled due to wire disconnection or short-circuit will now be described with reference to FIGS. 4A and 4B. In step 120, decision is made as to whether or not the discharge air temperature sensor 12 is disabled due to wire disconnection or short-circuit trouble. When the result of decision in step 120 proves that the discharge air temperature sensor 12 is disabled, whether or not the air conditioner is placed in its heating mode is checked in step 122. After confirming that the air conditioner is operating in its heating mode, step 122 is followed by step 124 in which decision is made as to whether or not the freezing temperature sensor 13 is free from wire disconnection or short-circuit trouble and is normally functioning. When the result of decision proves that the freezing temperature sensor 13 is normally functioning, step 124 is followed by step 126 in which the sum of the value measured by the freezing temperature sensor 13 and the fixed value γ is substituted for the value that will be measured by the discharge air temperature sensor 12. On the other hand, when the result of decision in step 124 proves that the freezing temperature sensor 13 is disabled due to wire disconnection or short-circuit, step 124 is followed by the abnormal termination step 164. In step 128 succeeding step 126, the operation of the air conditioner is controlled on the basis of the sum of the value measured by the freezing temperature sensor 13 and the fixed value β.

On the other hand, when the result of decision in step 122 proves that the discharge air temperature sensor 12 is disabled in the cooling mode, step 122 is followed by step 130 in which decision is made as to whether or not the freezing temperature sensor 13 is disabled due to wire disconnection or short-circuit. When the result of decision in step 130 proves that the freezing temperature sensor 13 is not disabled, step 130 is followed by step 132. On the other hand, when the result of decision in step 130 proves that the freezing temperature sensor 13 is disabled, step 130 is followed by the abnormal termination step 164.

The temperature of the discharge air flow 23 supplied from the heat exchanger 24 in the indoor unit 2 and measured by the discharge air temperature sensor 12 is presumed to be substantially equal to the sum of the temperature of the suction air flow 25 supplied to the heat exchanger 24 in the indoor unit 2 and measured by the suction air temperature sensor 11 and the temperature of the refrigerant flowing into the heat exchanger 24 and measured by the freezing temperature sensor 13. Therefore, in step 132, the sum of the value measured by the suction air temperature sensor 11 and that measured by the freezing temperature sensor 13 is stored in the memory as the value that will be measured by the discharge air temperature sensor 12. Then, the cooling operation of the air conditioner is controlled on the basis of the sum of the value measured by the suction air temperature sensor 11 and that measured by the freezing temperature sensor 13.

Steps 140 to 162 in FIGS. 4A and 4B show the sequence of control executed when the freezing temperature sensor 13 is disabled. In this case, when the value measured by the compressor suction gas temperature sensor 10 is larger than a fixed value γ, this fixed value γ can be used as a substitute for the value that will be measured by the freezing temperature sensor 13, for the reason which will now be described.

The principal object of the freezing temperature sensor 13 is to prevent freezing of the heat exchanger 24 in the indoor unit 2 during the cooling operation of the air conditioner. When the heat exchanger 24 in the indoor unit 2 is normally operating, that is, when it is not frozen, the value measured by the compressor suction gas temperature sensor 10 disposed at the inlet of the compressor 30 into which the refrigerant returns from the indoor heat exchanger 24 after passing through the accumulator 29 is larger than the fixed value γ. Therefore, even if the freezing temperature sensor 13 is disabled, the fact that the heat exchanger 24 in the indoor unit 2 is not frozen can be detected when the value measured by the compressor suction gas temperature sensor 10 is larger than the fixed value γ, so that the air conditioner can continue its cooling operation on the basis of the value γ which substitutes the value that was measured by the freezing temperature sensor 13.

The processing sequence to deal with the case where the freezing temperature sensor 13 is disabled will now be described with reference to the flow chart of Figs. 4A and 4B. In step 140, decision is made as to whether or not the freezing temperature sensor 13 is disabled. When the result of decision in step 140 proves that the freezing temperature sensor 13 is disabled due to wire disconnection or short-circuit, step 140 is followed by step 142 in which decision is made as to whether or not the air conditioner is operating in its cooling mode. When the result of decision in step 142 is "YES", step 142 is followed by step 144 in which decision is made as to whether or not the compressor suction gas temperature sensor 10 is disabled due to wire disconnection or short-circuit. When the result of decision in step 144 proves that the compressor suction gas temperature sensor 10 is not disabled, step 144 is followed by step 146 in which decision is made as to whether or not the value of the temperature of the compressor suction gas is larger than or equal to the fixed value γ. When the result of decision in step 146 proves that the value of the suction gas temperature ≧γ, step 146 is followed by step 148 in which the fixed value γ is stored in the memory as the value that will be measured by the freezing temperature sensor 13. Then, in step 150, the air conditioner continues its cooling operation on the basis of the fixed value γ. When, in the course of the above flow, the result of decision in step 142 proves that the air conditioner is not in its cooling mode, or when the result of decision in step 146 proves that the value of the suction gas temperature <γ, step 142 or 146 is followed by the abnormal termination step 164. In the aforementioned steps 140 to 150, the value measured by the compressor suction gas temperature sensor 10 is compared with the fixed value γ when the freezing temperature sensor 13 is disabled. Because the compressor suction gas temperature sensor 10 is associated with the microcomputer 17 in the outdoor unit 1, operation in step 150 is controlled by the microcomputer 17 in the outdoor unit 1. This is because the microcomputer 17 in the outdoor unit 1 is the host relative to the microcomputer 18 in the indoor unit 2 and the microcomputer 19 in the remote control switch 3.

When the result of decision in step 144 proves that the compressor suction gas temperature sensor 10 is disabled due to wire disconnection or short-circuit trouble, step 144 is followed by a step 160 in which the result of subtraction (a negative value) of the value measured by the suction air temperature sensor 11 from the value measured by the discharge air temperature sensor 12 is regarded as the value that will be measured by the freezing temperature sensor 13. Then, in step 162, the cooling operation of the air conditioner is continued on the basis of the value representing the result of subtraction of the value measured by the suction air temperature sensor 11 from the value measured by the discharge air temperature sensor 12.

As described above, the air conditioner is operated on the basis of a substituted value in each of steps 116, 128, 134, 150 and 162 in the flow chart of FIGS. 4A and 4B. In this case, whether or not the sensors are disabled is repeatedly decided in the loops starting from step 110. Therefore, when any one of the sensors is disabled or when the desired relation between the compressor suction gas temperature and the fixed value $\gamma$ is not satisfied, this is quickly detected to stop the flow in the abnormal termination step 164, so that such a situation can be dealt with so as to ensure the safety.

It will be understood from the foregoing detailed description of the present invention that, even when any one of sensors provided for an air conditioner is disabled due to wire disconnection, short-circuit or like, the value that will be measured by the disabled sensor if it is not disabled is presumed on the basis of the value measured by another normal sensor, and such a program is stored in a microcomputer. Therefore, the air conditioner can continuously be operated on the basis of the presumed value without being stopped as if the disabled sensor is normally functioning without the need for indicating the abnormal condition of the sensor.

We claim:

1. A method for operating an air conditioner to supply conditioned air to a room, comprising an outdoor unit and an indoor unit, said air conditioner being controlled by a plurality of temperature sensors including a suction air temperature sensor disposed in the indoor unit for measuring the temperature of suction air flow supplied to a heat exchanger in the indoor unit, and a radiation temperature sensor disposed in the indoor unit to measure the radiation temperature in the room, said suction air temperature sensor having a complementary relation with said radiation temperature sensor, said method comprising the steps of:

detecting at least one of a wire disconnection and short circuit of said suction air temperature sensor;

replacing a value measured by said suction air temperature sensor after the at least one of the wire disconnection and short circuit is detected with a value measured by said radiation temperature sensor if said radiation temperature sensor is operating normally;

continuing the operation of said air conditioner by controlling the air conditioner with the value measured by said radiation temperature sensor.

2. A method for operating an air conditioner to supply conditioned air, when the air conditioner is in a heating mode, comprising an outdoor unit and an indoor unit, said air conditioner being controlled by values of a plurality of temperature sensors including a discharge air temperature sensor disposed in the indoor unit for measuring the temperature of discharge air flow discharged from a heat exchanger within the indoor unit and a freezing temperature sensor for measuring the temperature of a refrigerant flowing into said heat exchanger within the indoor unit, said discharge air temperature sensor having a complementary relation with said freezing temperature sensor, said method comprising the steps of:

detecting at least one of a wire disconnection and short circuit of said discharge air temperature sensor disposed in the indoor unit;

replacing a value measured by said discharge air temperature sensor after the at least one of the wire disconnection and short circuit is detected with a sum of a value measured by said freezing temperature sensor and said predetermined value $\beta$ if said freezing sensor is operating normally, and continuing the operation of the air conditioner by controlling the air conditioner with the sum of the value measured by said freezing temperature sensor and the predetermined value $\beta$.

3. A method for operating an air conditioner to supply conditioned air, when the air conditioner is in a cooling mode, comprising an outdoor unit and an indoor unit, said air conditioner being controlled by values of a plurality of temperature sensors including a discharge air temperature sensor disposed in the indoor unit for measuring the temperature of discharge air flow discharge from a heat exchanger in the indoor unit, a section air temperature sensor disposed in the indoor unit for measuring the temperature of suction air flow supplied to said indoor heat exchanger and a freezing temperature sensor for measuring the temperature of a refrigerant flowing into said indoor heat exchanger, said discharge air temperature sensor having a complementary relation with said suction air temperature sensor and said freezing temperature sensor, said method comprising the steps of:

detecting at least one of a wire disconnection and short circuit of said discharge air temperature sensor disposed in the indoor unit;

replacing a value measured by said discharge air temperature sensor after the at least one of the wire disconnection and short circuit is detected with a sum of a value measured by suction air temperature sensor and a value measured by said freezing temperature sensor if said suction air temperature sensor and said freezing temperature sensor is operating normally; and continuing the operation of the air conditioner by controlling the air conditioner with the sum of the value measured by said suction air temperature sensor and the value measured by said discharge air temperature sensor.

4. A method for operating an air conditioner to supply conditioned air, comprising an indoor unit and an outdoor unit when the air conditioner is in a cooling mode, said air conditioner being controlled by values of a plurality of temperature sensors including a freezing temperature sensor for measuring the temperature of a refrigerant flowing into a heat exchanger in the indoor unit and a compressor suction gas temperature sensor disposed in the outdoor unit for measuring the temperature of suction gas flow supplied to a compressor in the outdoor unit, said freezing temperature sensor having a complementary relation with said compressor suction gas temperature sensor, said method comprising the steps of:

detecting at least one of a wire disconnection and a short circuit of said freezing temperature sensor, replacing a value of said freezing temperature sensor after the at least one of the wire disconnection and the short circuit is detected with a predetermined value $\gamma$ when the value measured by said compressor suction gas temperature sensor is larger than the predetermined value $\gamma$ if said compressor suction gas temperature sensor is operating normally;

continuing operation of the air conditioner by controlling the air conditioner with the predetermined value $\gamma$ when the value measured by said compressor suction gas temperature sensor is larger than the predetermined value $\gamma$.

5. A method for operating an air conditioner according to claim 4, wherein the plurality of temperature sensors further includes:

a discharge air temperature sensor disposed in the indoor unit for measuring the temperature of discharge air flow discharged from said indoor heat exchanger and a suction air temperature sensor disposed in the indoor unit for measuring the temperature of suction air flow supplied to said indoor heat exchanger, said method further comprises the steps of:

detecting at least one of wire disconnection and short circuit of said compressor suction gas temperature sensor disposed in the indoor unit;

replacing the value measured by said freezing temperature sensor after the malfunction is detected with a value obtained by subtracting a value measured by the suction air temperature sensor from a value measured by said discharge air temperature sensor;

continuing the operation of the air conditioner by controlling the air conditioner with the value obtained by the subtraction value.

* * * * *